United States Patent [19]
Hilton

[11] Patent Number: 5,530,934
[45] Date of Patent: Jun. 25, 1996

[54] DYNAMIC MEMORY ADDRESS LINE DECODING

[75] Inventor: William K. Hilton, Phoenix, Ariz.

[73] Assignee: VLSI Technology, Inc., S.J., Calif.

[21] Appl. No.: 191,743

[22] Filed: Feb. 1, 1994

Related U.S. Application Data

[63] Continuation of Ser. No. 659,795, Feb. 2, 1991, abandoned.

[51] Int. Cl.[6] ................................................. G06F 12/06
[52] U.S. Cl. .................. 395/405; 395/402; 395/432; 395/412; 395/421.01
[58] Field of Search ......................... 395/402, 405, 395/412, 421.01, 432

[56] References Cited

U.S. PATENT DOCUMENTS

| | | | |
|---|---|---|---|
| 4,468,729 | 8/1984 | Schwartz | 395/425 |
| 4,542,454 | 9/1985 | Brcich et al. | 395/425 |
| 4,592,011 | 5/1986 | Mantellina et al. | 395/425 |
| 4,809,234 | 2/1989 | Kuwashiro | 395/425 |
| 4,908,789 | 3/1990 | Blokkum et al. | 395/425 |
| 4,926,314 | 5/1990 | Dhuey | 395/425 |
| 4,943,966 | 7/1990 | Giunta et al. | 395/400 |
| 4,951,248 | 8/1990 | Lynch | 395/425 |
| 4,980,850 | 12/1990 | Morgan | 395/425 |
| 5,012,408 | 4/1991 | Conroy | 395/425 |
| 5,119,486 | 6/1992 | Albonesi | 395/425 |

Primary Examiner—Reba I. Elmore
Attorney, Agent, or Firm—Harry M. Weiss & Associates

[57] ABSTRACT

An apparatus dynamically decodes memory addresses while supporting memory map options that require different memory bits which are dependent upon the memory address. A current CPU address or an address stored in an expanded memory specification (EMS) register is selected as the defining address. This defining address is then decoded by one of twenty-five (25) memory map options available. The resultant decoded signal drives select lines of a multiplexer whose output drives memory address lines to on-board banks of DRAMS.

12 Claims, 2 Drawing Sheets

DYNAMIC ADDRESS DECODING TO SELECT MEMORY ADDRESSES

LINEAR ADDRESSING

STATIC DECODING
(FIXED FOR GIVEN SYSTEM DESIGN)

5,530,934

DYNAMIC MEMORY ADDRESS LINE DECODING

This is a continuation of application Ser. No. 07/659,795, filed Feb. 22, 1991, now abandoned.

TECHNICAL FIELD

The present invention relates, in general, to decoding memory addresses and, more particularly, to dynamically decoding memory addresses while supporting memory map options that require different memory bits which are dependent upon the memory address.

BACKGROUND ART

Various approaches are available for transmitting memory addresses from a central processing unit (CPU) to a memory array comprising a plurality of DRAMs. For example, in the case of linear addressing, the address bits from the CPU address bus are latched by latching registers as row addresses (RA) and column addresses (CA) and are multiplexed out on the memory address (MA) bus to the memory array. An address selector multiplexes either row addresses (RA) or column addresses (CA), depending on which strobe (row address strobe or column address strobe) is actuated. In the linear addressing case, the memory address lines are dependent upon the current CPU address. In another case, the memory address lines can be selected by information contained in the interleave mode and the memory map set-up. In this case, which is referred to as "static" memory address decoding, the desired functions are selected by the user by writing into configuration registers to define the type of interleave (word or block) desired and to select the memory map to be utilized. Each of the foregoing approaches has inherent disadvantages in that it cannot be utilized when memory maps support mixed DRAM sizes. For example, when utilizing a controller that can support four banks of DRAMs, with each DRAM bank including three sizes of DRAMs, twenty-five (25) different memory map options are available and many of these options include different DRAM sizes. It has been found that fifteen (15) of these memory map options cannot be implemented by the aforementioned prior art approaches. These unsupported memory map options are those which include mixed DRAM sizes and all three bank options.

Because the prior art approaches cannot be utilized to implement particular memory map options, it has become desirable to develop a method and apparatus for dynamically decoding the current CPU address without input from the user as to type of interleaving required and/or the memory map option desired.

SUMMARY OF THE INVENTION

The present invention solves the problems associated with the prior art approaches and other problems by providing a method and apparatus for dynamically decoding the CPU memory address and transmitting same to the memory array without requiring the user to select the type of interleaving required and/or the memory map option desired. The foregoing is accomplished by selecting the current CPU address or the address stored in the EMS (expanded memory specification) register as the defining address. This defining address is then decoded by one of the twenty-five (25) memory maps available. The resultant drives the select lines on a multiplexer which, in turn, drives the memory address lines to the on-board banks of DRAMs.

DESCRIPTION OF THE PREFERRED EMBODIMENT

The present invention involves a method and apparatus for dynamically decoding memory address bits and multiplexing same onto memory address lines while supporting a memory map option that requires different memory bits depending upon the current memory address, and which facilitates the generation of memory address lines at a speed sufficient to support 33 megahertz operation. The fundamental concept of this invention is to use the CPU memory address or the address stored in the expanded memory specification (EMS) register to dynamically decode an address which is then multiplexed out onto the memory address lines. The foregoing is accomplished in three steps:

the current CPU address or the address stored in the EMS register is selected as the defining address;

the defining address is then decoded by whatever memory map has been selected from the twenty-five (25) memory map options available and drives the selected lines on a multiplexer; and the selected input to the multiplexer then drives the memory address lines.

"Memory" for the purposes of this discussion is an array of on-board DRAMs. Four banks of DRAMs, each comprising three DRAM sizes (256K, 1M and 4M), each DRAM size requiring a different number of address lines, are provided. There are twenty-five different memory map options from which to choose and many of the memory map options support mixing different DRAM types. Signals from the controller chip to the DRAM array utilize a 32 bit bi-directional data bus for memory "reads" and memory "writes". During memory "reads", data from the DRAMs are inputted onto the foregoing bi-directional data bus, whereas during memory "writes", data on this bus are transmitted to the DRAMs for storage purposes. The system also includes a memory address (MA) bus which permits the addressing of each memory bit in the DRAM array, and timing strobes RAS (row address strobe) and CAS (column address strobe). "Dynamic" in this case means that the CPU address lines or the address stored in the EMS register and which are multiplexed out on the memory address (MA) lines are dependent on the current CPU address or the address stored in the EMS register.

Figure 1:
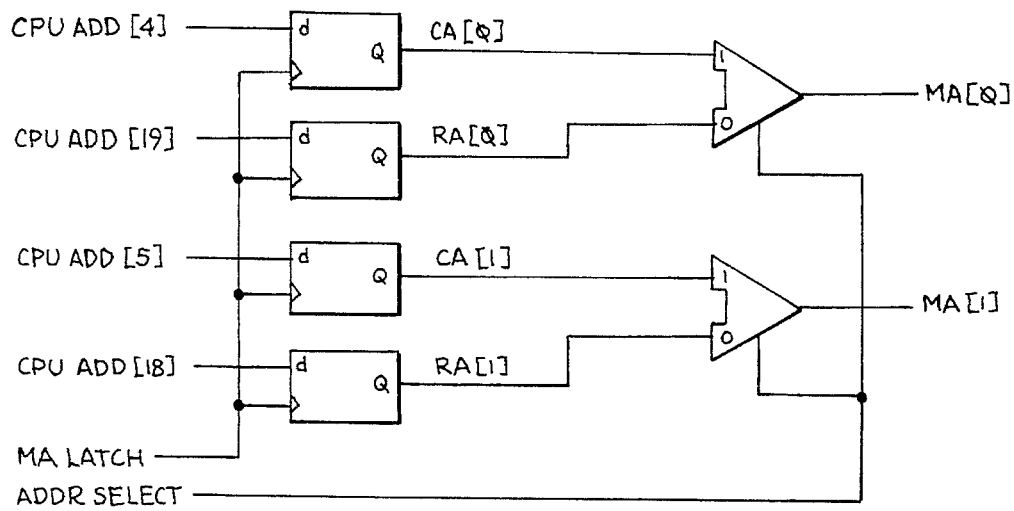
FIG. 1 is a logic diagram depicting linear addressing.

Referring now to FIG. 1, the logic depicting linear addressing is illustrated. In this type of addressing, the CPU address or the address stored in the EMS register is latched by the memory controller. The memory address (MA) lines are multiplexed out to the DRAM array first as row addresses (latched by the row address strobe), and then as column addresses (latched by the column address strobe). FIG. 1 illustrates the generation of two memory address (MA) lines. In more complex memory systems, however, generation of the memory address (MA) lines is much more involved. For example, a 80386DX system controller chip supports features which make generation of the memory addresses significantly more difficult. The foregoing controller can support three (3) sizes of DRAMs, each requiring a different number of address lines. In addition, the foregoing controller can support up to four banks of DRAMs. Furthermore, twenty-five (25) different memory map options are available, and many of the memory map options support mixing different DRAM types, for example, see Table 1 for memory map options supported. The foregoing controller also supports both word and block interleaving for pairs of like size banks of DRAMs. Interleaving is a technique where consecutive memory addresses can go to different banks of DRAMs, allowing sufficient time between same bank accesses so that slower access memories can be used with minimal performance penalties. In word interleaving, the interleave occurs on CPU address bit 2. In block interleaving, the interleave occurs on CPU address bit 11. Three of the memory map options shown in Table 1 support four banks of like size DRAMs (options 3, B, and 17) and four-way interleaving can occur with word interleaving based on CPU address bits 2 and 3 and block interleaving based on CPU address bits 11 and 12. Table 2 illustrates which CPU addresses get multiplexed out on the memory address (MA) lines as column addresses (CA) and row addresses (RA) lines for all combinations of DRAM types and interleaving options. The foregoing table illustrates that several of the address bits are simply passed through. In a simple memory system, this would normally be the case and all bits would map out directly, and there would be no need to multiplex out different CPU bits for a given row address (RA) or column address (CA).

Figure 2:
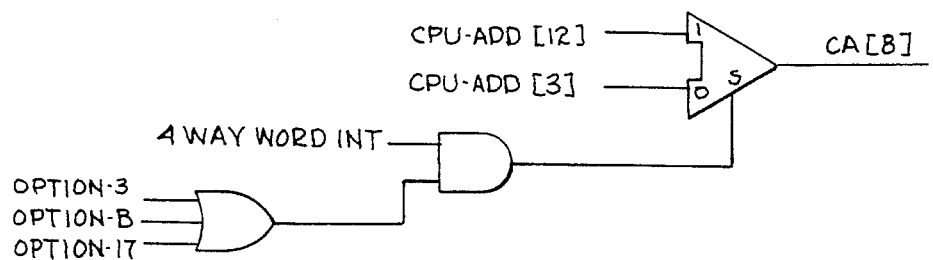
FIG. 2 is a logic diagram depicting "static" memory address decoding.

Referring now to FIG. 2, the logic depicting the selection of multiple CPU address lines from information contained in the interleave mode and the memory map set-up is illustrated. The foregoing information is chosen by the user by writing into two configuration registers in order to define the type of interleaving (word or block) desired and to select the type of memory map, chosen from the twenty-five (25) memory map options shown in Table 1, to be utilized. For example, FIG. 2 depicts the logic to implement column address line 8 (CA 8) which is a multiplex between CPU address bit 12 for a four-way word interleave in all three DRAM sizes and CPU address bit 3 in all other cases. If four-way word interleaving is selected and one of the options (option 3, B or 17) supporting four banks is also selected, then address bit 12 is multiplexed out on column address line 8 (CA 8). In all other cases, address bit 3 is multiplexed out on column address line 8 (CA 8). This approach is commonly referred to as "static" memory address decoding since the multiplex select is decoded independently of the current address and remains constant for a given memory map and interleaving combination.

The foregoing examples illustrated in FIGS. 1 and 2 show the prior art wherein selecting the memory address (MA) lines is based on conditions stored in registers. Of the twenty-five (25) different memory map options illustrated in Table 1, ten (10) options can be implemented based on register information, however, the remaining fifteen (15) options cannot be so implemented. The foregoing fifteen (15) memory map options which cannot be implemented are all memory maps with mixed DRAM sizes and all three banks options. This includes options 2, 5, 6, 8, 9, A, D, E, F, 10, 12, 13, 14, 15 and 16, as shown in Table 1. In contrast to the prior art approaches, the present invention provides a method and apparatus for multiplexing the memory address (MA) by dynamically decoding the current CPU address as opposed to the user selecting the type of interleaving (word or block) desired and the type of memory map to be utilized.

For each of the foregoing fifteen (15) memory map options, the decision whether to multiplex out bit 2 or bit 11 onto the column address line 7 (CA 7) depends on the current memory address.

Figure 3:
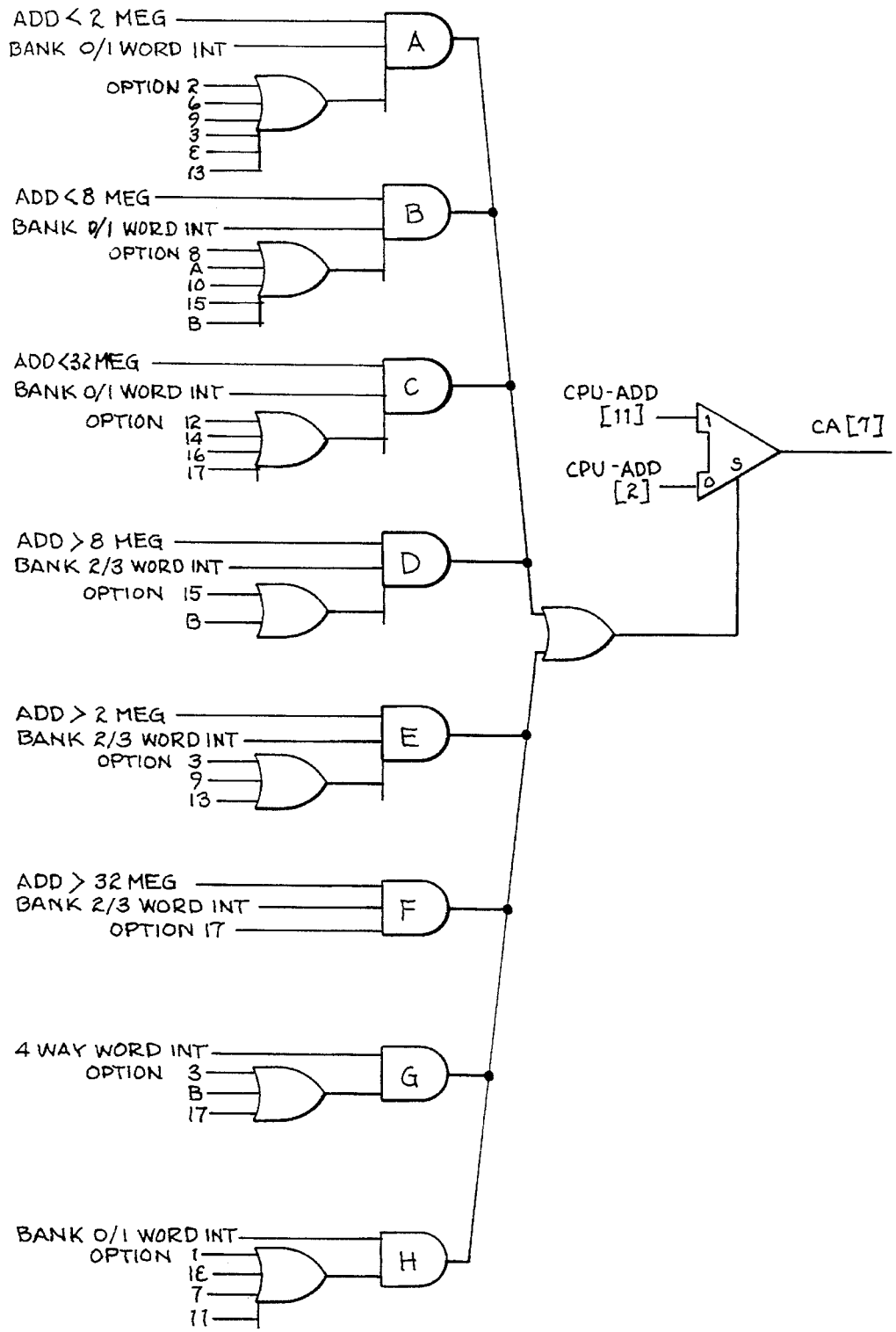
FIG. 3 is a logic diagram depicting the dynamic memory address line decoding of the present invention.

As an example of how the foregoing fifteen (15) memory map options with mixed DRAM sizes and/or three bank options can affect memory address (MA) line generation, the generation of column address line 7 (CA 7), which is CPU address bit 11 for all cases of word interleave and CPU address bit 2 in all other cases, will be reviewed. The decision whether to multiplex out bit 2 or bit 11 onto column address line 7 (CA 7) depends on the address to be decoded, whether the address is a CPU address or an address in the EMS register. Referring now to FIG. 3, the logic depicting dynamic address decoding is illustrated. Referring to option 2 of the memory map options shown in Table 1, this option supports 3 banks of 256K dynamic random access memory or 3 megabytes of total memory. Now referring to Table 3 for bank selects and bank address modes, in option 2, banks 0 and 1 form a matched pair since they utilize the same size DRAMs, and are accessed by CPU addresses from 0 to 2 megabytes. Bank 2 is accessed by CPU addresses from 2 to 3 megabytes. Thus, if the CPU address is in the range of 0000 0000h to 001F FFFFh, either bank 0 and bank 1 is active depending upon the status of the interleave bit for word interleaving, viz., bit 2, and address bit 11 is multiplexed out on column address line 7 (CA 7). If the CPU address is in the range of 0020 0000h to 002F FFFFh, then bank 2 is active, no interleaving is permitted, and address bit 2 is multiplexed out on column address line 7 (CA 7).

In FIG. 3, gates marked A, B, C, D, E and F are "dynamic" in that for a given memory map option, these gates are active or inactive selecting address bit 11 or address bit 2 for transmission on the column address line 7 (CA 7) depending upon the current CPU address. Gates marked G and H are "static" in that they are active or inactive independent of the CPU address. In the foregoing example for memory map option 2 and assuming word interleaving, a CPU address under 2 megabytes causes gate A to go "high" resulting in address bit 11 being multiplexed out on column address line 7 (CA 7). If the CPU address is in the 2 to 3 megabyte range, then gate A is inactive (along with gates B through H) and address bit 2 is multiplexed out on column address line 7 (CA 7).

This last example illustrates the advantages resulting from dynamic address decoding (i.e., selecting memory addresses by internal integrated circuit decoding) as opposed to the method depicted in FIGS. 1 and 2 where address selection is accomplished either by latched registers or by configuration registers which require the user to define the type of interleaving desired and the memory map option utilized. As a result of this internal decoding approach, the generation of memory address lines will be sufficiently fast to support 33 megahertz operation within a complex memory map structure.

Figure 4:
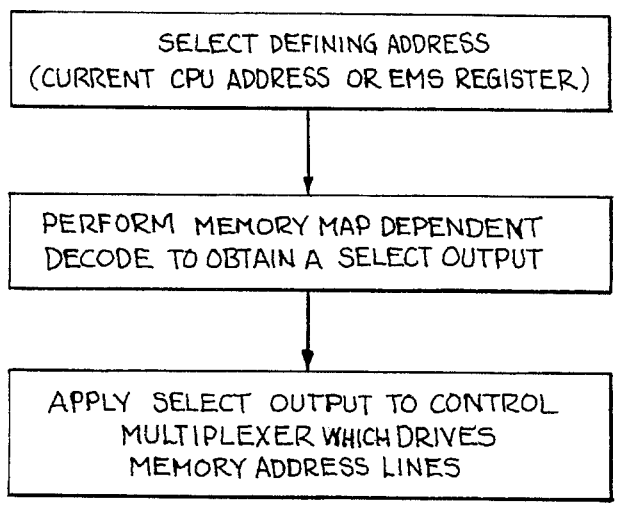
FIG. 4 is a flow chart showing the steps of the method of the present invention.

A flow chart showing the general steps of the method of dynamic memory address decoding according to the present invention is shown in FIG. 4.

Certain modifications and improvements will occur to those skilled in the art upon reading the foregoing. It should be understood that all such modifications and improvements have been deleted herein for the sake of conciseness and readability, but are properly with the scope of the following claims.

I claim:

1. An apparatus for decoding addresses of memory storage locations, said apparatus comprising:

memory means for storing information comprising a plurality of banks of memory storage locations, each of said banks of said plurality of said banks of memory storage locations further comprising a plurality of memory storage elements, each of said plurality of memory storage elements further comprising a plurality of said memory storage locations, each of said memory storage locations having an address;

means for selecting a first memory storage location, said first memory storage location having a first address, said first memory storage location containing a map of said plurality of banks of memory storage locations to be selected, said means for selecting said first memory storage location comprising a central processing unit (CPU);

decoding means for decoding said map of said plurality of banks of memory storage locations to be selected, said decoding means having an output; and multiplexing means coupled to said output of said decoding means for selecting a second memory storage location having a second address, said second address being dependent upon said map of said plurality of banks of memory storage locations to be selected contained in said first memory storage location;

said decoding means comprising:

a first and a second plurality of OR gates each having a plurality of input signals and each of said plurality of input signals to said first and second plurality of OR gates corresponding to a selection of a map of said plurality of banks of memory storage locations;

a first plurality of AND gates each having an input coupled to an output from a respective one of said first plurality of OR gates and each of said first plurality of AND gates having another input that indicates when word interleaving is required and each of said first plurality of AND gates having yet another input that indicates when a desired range of memory storage locations is selected, said yet another input being a signal representation of a result of at least one of a comparison between a CPU address and said desired range of memory storage locations and another comparison between an EMS register and said desired range of memory storage locations;

a second plurality of AND gates each having an input coupled to an output from a respective one of said second plurality of OR gates and each of said second plurality of AND gates having another input that indicates when word interleaving is required; and an OR gate having inputs from an output of each of said first and said second plurality of AND gates, said OR gate providing said output of said decoding means.

2. The apparatus defined in claim 1 wherein said plurality of memory storage elements comprise memory storage elements of different size.

3. The apparatus defined in claim 1 wherein said plurality of memory storage elements comprise dynamic random access memories.

4. The apparatus defined in claim 1 wherein said banks of memory storage locations comprise memory storage elements of different size.

5. The apparatus defined in claim 1 wherein said banks of memory storage locations comprise at least two memory storage elements of equivalent size.

6. The apparatus defined in claim 1 wherein said banks of memory storage locations comprise at least three memory storage elements of equivalent size.

7. A method for decoding addresses of memory storage locations comprising the steps of:

storing information in memory means comprising a plurality of banks of memory storage locations, each of said banks of said plurality of said banks of memory storage locations further comprising a plurality of memory storage elements, each of said plurality of memory storage elements further comprising a plurality of said memory storage locations, each of said memory storage locations having an address;

selecting a first memory storage location, said first memory storage location having a first address, said first memory storage location containing a map of said plurality of banks of memory storage locations to be selected, said selecting of said first memory storage location being executed by a central processing unit (CPU);

decoding said map of said plurality of banks of memory storage locations to be selected by decoding means, said decoding means having an output; and selecting a second memory storage location having a second address by multiplexing means, said second address being dependent upon said map of said plurality of banks of memory storage locations to be selected contained in said first memory storage location;

said decoding means comprising:

a first and a second plurality of OR gates each having a plurality of input signals and each of said plurality of input signals to said first and second plurality of OR gates corresponding to a selection of a map of said plurality of banks of memory storage locations;

a first plurality of AND gates each having an input coupled to an output from a respective one of said first plurality of OR gates and each of said first plurality of AND gates having another input that indicates when word interleaving is required and each of said first plurality of AND gates having yet another input that indicates when a desired range of memory storage locations is selected, said yet another input being a signal representation of a result of at least one of a comparison between a CPU address and said desired range of memory storage locations and another comparison between an EMS register and said desired range of memory storage locations;

a second plurality of AND gates each having an input coupled to an output from a respective one of said second plurality of OR gates and each of said second plurality of AND gates having another input that indicates when word interleaving is required; and an OR gate having inputs from an output of each of said first and said second plurality of AND gates, said OR gate providing said output of said decoding means.

8. The method defined in claim 7 wherein said plurality of memory storage elements comprise memory storage elements of different size.

9. The method defined in claim 7 wherein said plurality of memory storage elements comprise dynamic random access memories.

10. The method defined in claim 7 wherein said banks of memory storage locations comprise memory storage elements of different size.

11. The method defined in claim 7 wherein said banks of memory storage locations comprise at least two memory storage elements of equivalent size.

12. The method defined in claim 7 wherein said banks of memory storage locations comprise at least three memory storage elements of equivalent size.

* * * * *

UNITED STATES PATENT AND TRADEMARK OFFICE
CERTIFICATE OF CORRECTION

PATENT NO. : 5,530,934
DATED : Jun. 25, 1996
INVENTOR(S) : Hilton

It is certified that error appears in the above-indentified patent and that said Letters Patent is hereby corrected as shown below:

Add the Drawing Sheets(s), consisting of Sheet 3 of 4 and Sheet 4 of 4, as shown on the attached pages.

Signed and Sealed this

Seventh Day of October, 1997

Attest:

BRUCE LEHMAN

Attesting Officer

Commissioner of Patents and Trademarks

TABLE 1. DRAM MEMORY MAPS SUPPORTED

| BANK0 | BANK1 | BANK2 | BANK3 | MEMORY MB | RAMMAP(4-0) |
|---|---|---|---|---|---|
| 256K | | | | (1.38) 1.00 | (1F) 0 |
| 256K | 256K | | | (2.30) 2.00 | (1E) 1 |
| 256K | 256K | 256K | | 3.00 | 2 |
| 256K | 256K | 256K | 256K | 4.00 | 3 |
| 1M | | | | 4.00 | 4 |
| 256K | 1M | | | 5.00 | 5 |
| 256K | 256K | 1M | | 6.00 | 6 |
| 1M | 1M | | | 8.00 | 7 |
| 1M | 1M | 256K | | 9.00 | 8 |
| 256K | 256K | 1M | 1M | 10.00 | 9 |
| 1M | 1M | 1M | | 12.00 | A |
| 1M | 1M | 1M | 1M | 16.00 | B |
| 4M | | | | 16.00 | C |
| 256K | 4M | | | 17.00 | D |
| 256K | 256K | 4M | | 18.00 | E |
| 1M | 4M | | | 20.00 | F |
| 1M | 1M | 4M | | 24.00 | 10 |
| 4M | 4M | | | 32.00 | 11 |
| 4M | 4M | 256K | | 33.00 | 12 |
| 256K | 256K | 4M | 4M | 34.00 | 13 |
| 4M | 4M | 1M | | 36.00 | 14 |
| 1M | 1M | 4M | 4M | 40.00 | 15 |
| 4M | 4M | 4M | | 48.00 | 16 |
| 4M | 4M | 4M | 4M | 64.00 | 17 |

TABLE 3. AUTOMATIC INTERLEAVE VS MEMORY MAP

| BANK | | | BANK | | |
|---|---|---|---|---|---|
| 0 | 1 | A BANK ADDRESS MODE | 2 | 3 | B BANK ADDRESS MODE |
| YES | NO | LINEAR | NO | NO | N/A |
| YES | YES | 2-WAY INTERLEAVE | NO | NO | N/A |
| YES | YES | 2-WAY INTERLEAVE | YES | NO | LINEAR |
| YES | YES | 2-WAY INTERLEAVE 0 AND 1* | YES | YES | 2-WAY INTERLEAVE 2 AND 3* |

*THIS IS FOR THE CASE WHERE BANKS A AND B CONTAIN DIFFERENT TYPES OF DRAMS. FOR MEMORY MAPS 05h, 0Gh AND 17h, ALL FOUR BANKS CONTAIN THE SAME DRAM TYPE AND FOUR-WAY INTERLEAVING IS USED FOR BOTH BANK PAIRS INTERLEAVE ON THE SAME BIT.

TABLE 2. CPU ADDRESS TO MEMORY ADDRESS TRANSLATIONS

| | 256K | | | | | 1M | | | | | 4M | | | | | MEM ADD. |
|---|---|---|---|---|---|---|---|---|---|---|---|---|---|---|---|---|
| | NONE | 2-WAY | | 4-WAY | | NONE | 2-WAY | | 4-WAY | | NONE | 2-WAY | | 4-WAY | | |
| | | BLOCK | WORD | BLOCK | WORD | | BLOCK | WORD | BLOCK | WORD | | BLOCK | WORD | BLOCK | WORD | |
| COLUMN ADDRESS | 4 | 4 | 4 | 4 | 4 | 4 | 4 | 4 | 4 | 4 | 4 | 4 | 4 | 4 | 4 | 0 |
| | 5 | 5 | 5 | 5 | 5 | 5 | 5 | 5 | 5 | 5 | 5 | 5 | 5 | 5 | 5 | 1 |
| | 6 | 6 | 6 | 6 | 6 | 6 | 6 | 6 | 6 | 6 | 6 | 6 | 6 | 6 | 6 | 2 |
| | 7 | 7 | 7 | 7 | 7 | 7 | 7 | 7 | 7 | 7 | 7 | 7 | 7 | 7 | 7 | 3 |
| | 8 | 8 | 8 | 8 | 8 | 8 | 8 | 8 | 8 | 8 | 8 | 8 | 8 | 8 | 8 | 4 |
| | 9 | 9 | 9 | 9 | 9 | 9 | 9 | 9 | 9 | 9 | 9 | 9 | 9 | 9 | 9 | 5 |
| | 10 | 10 | 10 | 10 | 10 | 10 | 10 | 10 | 10 | 10 | 10 | 10 | 10 | 10 | 10 | 6 |
| | 3 | 3 | 3 | 3 | 12 | -- | -- | -- | -- | -- | 11 | -- | -- | -- | -- | 7 |
| | 2 | 2 | 11 | 2 | 11 | 3 | 3 | 3 | 3 | 12 | 12 | 12 | 13 | 12 | 13 | 8 |
| | -- | -- | -- | -- | -- | 2 | 2 | 11 | 2 | 11 | 13 | 13 | 14 | 13 | 14 | 9 |
| | -- | -- | -- | -- | -- | -- | -- | -- | -- | -- | -- | -- | -- | -- | -- | 10 |
| ROW ADDRESS | 19 | 19 | 19 | 19 | 19 | 19 | 19 | 19 | 19 | 19 | 19 | 19 | 19 | 19 | 19 | 0 |
| | 18 | 18 | 18 | 18 | 18 | 18 | 18 | 18 | 18 | 18 | 18 | 18 | 18 | 18 | 18 | 1 |
| | 17 | 17 | 17 | 17 | 17 | 17 | 17 | 17 | 17 | 17 | 17 | 17 | 17 | 17 | 17 | 2 |
| | 16 | 16 | 16 | 16 | 16 | 16 | 16 | 16 | 16 | 16 | 16 | 16 | 16 | 16 | 16 | 3 |
| | 15 | 15 | 15 | 15 | 15 | 15 | 15 | 15 | 15 | 15 | 15 | 15 | 15 | 15 | 15 | 4 |
| | 14 | 14 | 14 | 14 | 14 | 14 | 14 | 14 | 14 | 14 | 14 | 14 | 14 | 14 | 14 | 5 |
| | 13 | 13 | 13 | 13 | 13 | 13 | 13 | 13 | 13 | 13 | 13 | 13 | 13 | 13 | 13 | 6 |
| | 12 | 12 | 12 | 12 | 12 | 12 | 12 | 12 | 23 | 23 | 23 | 23 | 23 | 23 | 23 | 7 |
| | 11 | 20 | 20 | 20 | 20 | 21 | 21 | 21 | 21 | 21 | 21 | 21 | 21 | 21 | 21 | 8 |
| | -- | -- | -- | 20 | 20 | 20 | 20 | 20 | 20 | 20 | 22 | 22 | 22 | 22 | 22 | 9 |
| | -- | -- | -- | -- | -- | -- | -- | -- | 22 | 22 | 20 | 20 | 20 | 25 | 25 | 10 |
| BANK SELECTS | -- | 11 | 11 | 11 | 11 | -- | 22 | 22 | 11 | 11 | -- | 24 | 24 | 11 | 11 | |
| | -- | 2 | 2 | 2 | 2 | -- | 2 | 2 | 2 | 2 | -- | 11 | 11 | 2 | 2 | |
| | -- | -- | -- | 12 | 12 | -- | -- | -- | 12 | 12 | -- | 2 | 2 | 12 | 12 | |
| | -- | -- | -- | 3 | 3 | -- | -- | -- | 3 | 3 | -- | -- | -- | 3 | 3 | |
| BANK ENABLE DECODES | 21 | 21 | 21 | 21 | 21 | 22 | 22 | 22 | 22 | 22 | 24 | 24 | 24 | 24 | 24 | |
| | 22 | 22 | 22 | 22 | 22 | 23 | 23 | 23 | 23 | 23 | 22 | 22 | 22 | 22 | 22 | |
| | 23 | 23 | 23 | 23 | 23 | 24 | 24 | 24 | 24 | 24 | 23 | 23 | 23 | 23 | 23 | |
| | 24 | 24 | 24 | 24 | 24 | 25 | 25 | 25 | 25 | 25 | 24 | 24 | 24 | 24 | 24 | |
| | 25 | 25 | 25 | 25 | 25 | -- | 25 | 25 | -- | -- | 25 | 25 | 25 | -- | -- | |

CA[10:0] THESE ARE DRIVING MA[10:0] DURING CAS.

RA[10:0] THESE DRIVE MA[10:0] DURING RAS.

THESE DO NOT DRIVE OUT BUT ARE DECODED INTERNALLY TO SELECT THE PROPER BANKS.